United States Patent
Ning et al.

(10) Patent No.: US 11,238,612 B2
(45) Date of Patent: Feb. 1, 2022

(54) DEVICE AND METHOD OF TRACKING POSES OF MULTIPLE OBJECTS BASED ON SINGLE-OBJECT POSE ESTIMATOR

(71) Applicants: Beijing Jingdong Shangke Information Technology Co., Ltd., Beijing (CN); JD.com American Technologies Corporation, Mountain View, CA (US)

(72) Inventors: Guanghan Ning, Santa Clara, CA (US); Ping Liu, Mountain View, CA (US); Xiaochuan Fan, Mountain View, CA (US); Chi Zhang, Fremont, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 271 days.

(21) Appl. No.: 16/388,854

(22) Filed: Apr. 18, 2019

(65) Prior Publication Data
US 2020/0074678 A1    Mar. 5, 2020

Related U.S. Application Data

(60) Provisional application No. 62/724,007, filed on Aug. 28, 2018.

(51) Int. Cl.
*G06T 7/73*     (2017.01)
*G06T 7/11*     (2017.01)
(Continued)

(52) U.S. Cl.
CPC ............... *G06T 7/75* (2017.01); *G06T 7/11* (2017.01); *G06T 7/246* (2017.01);
(Continued)

(58) Field of Classification Search
CPC .. G06T 7/75; G06T 7/11; G06T 7/246; G06K 9/00369; G06K 2209/21;
(Continued)

(56) References Cited

U.S. PATENT DOCUMENTS

| 8,073,190 | B2 * | 12/2011 | Gloudemans | ........... G06T 15/20 382/100 |
| 8,477,998 | B1 | 7/2013 | Kim et al. | |

(Continued)

FOREIGN PATENT DOCUMENTS

| CN | 102456225 A | 5/2012 |
| CN | 103177269 A | 6/2013 |
| CN | 108629791 A | 10/2018 |

OTHER PUBLICATIONS

Andriluka et al., Posetrack: A benchmark for human pose estimation and tracking, Proceedings of the IEEE Conference on Computer Vision and Pattern Recognition, 2018, pp. 5167-5176.

(Continued)

*Primary Examiner* — Shefali D Goradia
(74) *Attorney, Agent, or Firm* — China Science Patent & Trademark US LLC; Shanyun Lu

(57) ABSTRACT

A method, a device and a non-transitory computer readable medium for tracking poses of multiple objects. The method includes detecting, by a processor, objects from each of a plurality of consecutive frames in a video sequence; estimating, by the processor, a pose of each of the objects within each of the plurality of consecutive frames; and tracking, by the processor, the poses of each of the objects across the plurality of consecutive frames.

14 Claims, 8 Drawing Sheets

(51) Int. Cl.
*G06T 7/246* (2017.01)
*G06K 9/00* (2006.01)

(52) U.S. Cl.
CPC ..... *G06K 9/00369* (2013.01); *G06K 2209/21* (2013.01); *G06T 2207/10016* (2013.01); *G06T 2207/20016* (2013.01); *G06T 2207/20072* (2013.01); *G06T 2207/30196* (2013.01)

(58) Field of Classification Search
CPC .......... G06K 2207/10016; G06K 2207/20016; G06K 2207/20072; G06K 2207/30196
See application file for complete search history.

(56) References Cited

U.S. PATENT DOCUMENTS

| | | | |
|---|---|---|---|
| 9,323,991 B2* | 4/2016 | Bernal | G06K 9/00765 |
| 10,133,951 B1* | 11/2018 | Mendonca | G06K 9/4642 |
| 2018/0165548 A1 | 6/2018 | Wang et al. | |
| 2019/0026538 A1* | 1/2019 | Wang | G06K 9/4642 |
| 2019/0114804 A1* | 4/2019 | Sundaresan | G06K 9/66 |
| 2021/0090284 A1* | 3/2021 | Ning | G06K 9/00362 |

OTHER PUBLICATIONS

Cao et al., Realtime multi-object 2d pose estimation using part affinity fields. CVPR, 2017, pp. 7291-7299.
Chen et al., Cascaded Pyramid Network for Multi-object Pose Estimation, CVPR, 2018, pp. 7103-7112.
Dai et al., R-fcn: Object detection via region-based fully convolutional networks, 30th Conference on Neural Information Processing Systems, NIPS 2016.
Dai et al., Deformable convolutional networks, Computer Vision and Pattern Recognition, 2017, arXiv:1703.06211.
Girdhar et al., Detect-and-track: Efficient pose estimation in videos, Proceedings of the IEEE Conference on Computer Vision and Pattern Recognition, 2018, pp. 350-359.
Girshick, Fast R-CNN, Proceedings of the IEEE international conference on computer vision, 2015, pp. 1440-1448.
Fang et al., RMPE: Regional multi-object pose estimation, ICCV, 2017, arXiv:1612.00137.
He et al., Mask R-CNN, Computer Vision (ICCV), 2017 IEEE International Conference, 2017, pp. 2961-2969.
He et al., Deep residual learning for image recognition, CVPR, 2016, pp. 770-778.
Insafutdino et al., ArtTrack: articulated Vculated multi-object tracking in the wild, CVPR, 2017, pp. 6457-6465.
Iqbal et al., Posetrack: Joint multi-object pose estimation and tracking, IEEE Conference on Computer Vision and Pattern Recognition (CVPR), 2017, pp. 2011-2020.
Lin et al., Feature pyramid networks for object detection, CVPR, 2017, pp. 2117-2125.
Newwell, et al., Associative embedding: End-to-end learning for joint detection and grouping, Advances in Neural Information Processing Systems, 2017, pp. 1-11.
Ning et al., Knowledge-guided deep fractal neural networks for human pose estimation, IEEE Transactions on Multimedia, 2018, arXiv:1705.02407.
Papandreou, et al., Towards accurate multi-object pose estimation in the wild, CVPR, 2017, pp. 4903-4911.
Shao, et al., Crowdhuman: A benchmark for detecting human in a crowd, 2018, arXiv:1805.00123.
Xia et al., Joint multi-object pose estimation and semantic part segmentation, CVPR, 2017, pp. 6769-6778.
Xiao et al., Simple baselines for human pose estimation and tracking, ECCV, 2018, pp. 1-16.
Xiu et al., Pose flow: Efficient online pose tracking, BMVC, 2018, arXiv:1802.00977.
International Search Report for PCT/CN2019/100228.

\* cited by examiner

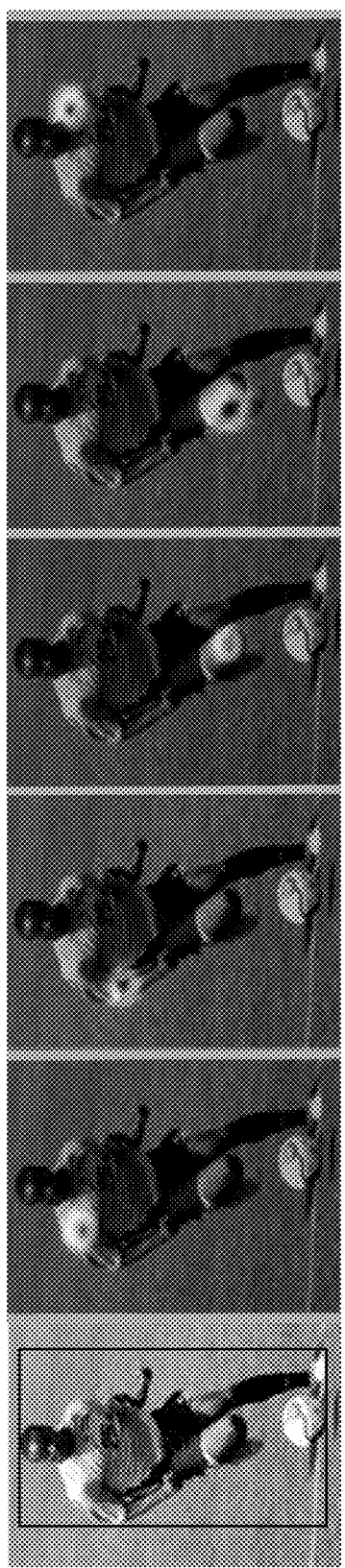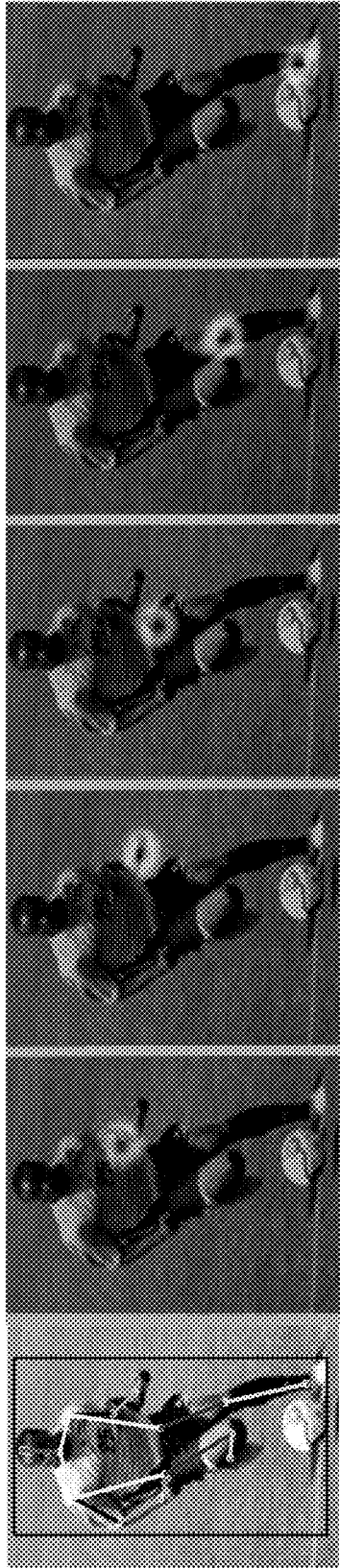

DEVICE AND METHOD OF TRACKING POSES OF MULTIPLE OBJECTS BASED ON SINGLE-OBJECT POSE ESTIMATOR

CROSS-REFERENCES

This application claims priority to and the benefit of, pursuant to 35 U.S.C. § 119(e), U.S. provisional patent application Ser. No. 62/724,007, filed Aug. 28, 2018, which is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates generally to the field of computer vision, and more particularly to a device and method of tracking poses of multiple objects based on a plurality of single-object pose estimators.

BACKGROUND

The background description herein is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Multi-object pose tracking is the task of estimating human keypoints of all object instances in a set of images forming a video sequence and assigning unique ids for each keypoint at instance-level across frames in the video sequence. Multi-object pose tracking is one of the most important components in various computer vision applications, such as surveillance, sports video analysis.

Existing approaches for pose estimation of multiple objects can be classified into top-down and bottom-up approaches. The top-down approach [8,16] relies on a detection module to obtain human candidates and then apply a single-person human pose estimator to locate human keypoints. The bottom-up approach [2, 9,18,14], on the other hand, detects human keypoints from all potential human candidates and then assembles these keypoints into human limbs for each individual based on various data association techniques. The advantage of bottom-up approaches is their excellent trade-off between estimation accuracy and computational cost because their computational cost is invariant to the number of human candidates in the image. In contrast, the main advantage of top-down approaches is their capability in disassembling the task into multiple comparatively easier tasks, i.e., object detection and single-person pose estimation. The object detector is expert in detecting hard (usually small) candidates, so that the pose estimator will perform better with a focused regression space.

For the task of multi-object pose tracking, accurate trajectory estimation of human keypoints is useful in human action recognition and human interaction understanding. PoseTrack [12] and ArtTrack [11] primarily introduce multi-object pose tracking challenge and propose a graph partitioning formulation, which transforms the pose tracking problem into a minimum cost multi-cut problem. However, hand-crafted graphical models are not scalable for long and unseen clips. Another line of research explores top-down approach [6, 19, 20] by operating multi-object pose estimation on each frame and linking them based on appearance similarities and temporal adjacencies. A solution is to apply multi-target object tracking on human detection candidates across frames and then estimate human poses for each human tubelet. While this is a feasible method, it neglects unique attributes of keypoints. Compared to the tracked bounding boxes, keypoints can potentially be helpful cues for both the bounding boxes and the keypoints tracking.

Therefore, there is a need for an improved approach to multi-object pose tracking.

SUMMARY

In some aspects, the present disclosure relates to a method of tracking poses of multiple objects. The method may include: detecting, by one or more processors, objects from each of a plurality of consecutive frames in a video sequence; estimating, by the one or more processors, a pose of each of the objects within each of the plurality of consecutive frames; and tracking, by the one or more processors, the poses of each of the objects across the plurality of consecutive frames.

In some embodiments, the step of detecting, by one or more processors, objects from each of a plurality of consecutive frames in a video sequence may include: determining, by the one or more processors, a bounding box for each of the objects from each of the plurality of consecutive frames; and determining, by the one or more processors, a confidence score of the bounding box for the one of the objects within the one of the plurality of consecutive frames.

In some embodiments, the step of estimating, by the one or more processors, a pose of each of the objects within each of the plurality of consecutive frames may include: determining, by the one or more processors, from a region defined by the bounding box for the one of the objects within the one of the plurality of consecutive frames, keypoints of the one of the objects within the one of the plurality of consecutive frames; and determining, by the one or more processors, confidence scores of the keypoints of the one of the objects within the one of the plurality of consecutive frames.

In some embodiments, the step of estimating, by the one or more processors, a pose of each of the objects within each of the plurality of consecutive frames may include: regressing, by the one or more processors, a region defined by the bounding box for the one of the objects within the one of the plurality of consecutive frames into heatmaps of the one of the objects within the one of the plurality of consecutive frames; suppressing, by the one or more processors, the heatmaps of the one of the objects within the one of the plurality of consecutive frames into keypoints of the one of the objects within the one of the plurality of consecutive frames with cross-heatmap pose non-maximum suppression (NMS); and determining, by the one or more processors, confidence scores of the keypoints of the one of the objects within the one of the plurality of consecutive frames.

In some embodiments, the step of estimating, by the one or more processors, a pose of each of the objects within each of the plurality of consecutive frames may include: applying, by the one or more processors, a model ensemble mode combing two or more pose estimation models to determine the keypoints of the one of the objects within the one of the plurality of consecutive frames, wherein the two or more pose estimation models include at least a first model and a second model.

In some embodiments, the model ensemble mode may include an expert mode in which, for each of the keypoints of each of the objects within each of the plurality of consecutive frames, a weight of one is assigned to one of pose estimation result for the first model and pose estimation result for the second model that has a higher average precision (AP) for the one of the keypoints, and a weight of zero is assigned to the other of the pose estimation result for the first model and the pose estimation result for the second model.

In some embodiments, the model ensemble mode may include an average mode in which, for all of the keypoints of each of the objects within each of the plurality of consecutive frames, a weight of 0.5 is assigned to pose estimation result for the first model and a weight of 0.5 is assigned to pose estimation result for the second model. In some embodiments, one of the first model and the second model may be epoch 291, and the other of the first model and the second model may be epoch 293.

In some embodiments, the step of detecting, by one or more processors, objects from each of a plurality of consecutive frames in a video sequence may be implemented by a deformable feature pyramid network (FPN) that is determined based on an object detector selecting mechanism.

In some embodiments, the step of tracking, by the one or more processors, the poses of each of the objects across the plurality of consecutive frames may include: assigning, by the one or more processors, a same identifier to the bounding boxes indicating a same one of the objects across the plurality of consecutive frames, and associating, by the one or more processors, the keypoints within the bounding boxes having the same identifier across the plurality of consecutive frames, so as to build a pose flow for each of the objects across the plurality of consecutive frames.

In some embodiments, the step of tracking, by the one or more processors, the poses of each of the objects across the plurality of consecutive frames may further include: performing, by the one or more processors, adaptive keypoint pruning on the keypoints of each of the objects within each of the plurality of consecutive frames with an adaptive keypoint pruner.

In some embodiments, the step of performing, by the one or more processors, adaptive keypoint pruning on the keypoints of each of the objects within each of the plurality of consecutive frames with an adaptive keypoint pruner may include: determining, by the one or more processors, a keypoint drop threshold for each of predefined categories of keypoint, wherein each of the keypoints of each of the objects within each of the plurality of consecutive frames belongs to one of the predefined categories of keypoint; dropping, by the one or more processors, a keypoint having a confidence score lower than a keypoint drop threshold for one of the predefined categories of keypoint to which the keypoint belongs; and retaining, by the one or more processors, a keypoint having a confidence score greater than or equal to a keypoint drop threshold for one of the predefined categories of keypoint to which the keypoint belongs. In some embodiments, the step of detecting, by one or more processors, objects from each of a plurality of consecutive frames in a video sequence may further include: converting, by the one or more processors, the result of the detection for each of the objects within each of the plurality of consecutive frames into an openSVAI standardized data format, so as to generate a standardized detection result.

In some embodiments, the step of estimating, by one or more processors, a pose of each of the objects within each of the plurality of consecutive frames may further include: converting, by the one or more processors, the result of the estimation for each of the objects within each of the plurality of consecutive frames into an openSVAI standardized data format, so as to generate a standardized estimation result.

In some aspects, the present disclosure relates to a device for tracking poses of multiple objects. The device may include: a processor; and a memory storing instructions which, when executed by the processor, cause the processor to: detect objects from each of a plurality of consecutive frames in a video sequence; estimate a pose of each of the objects within each of the plurality of consecutive frames; and track the poses of each of the objects across the plurality of consecutive frames.

In some embodiments, the instructions which, when executed by the processor, may further cause the processor to: determine a bounding box for each of the objects from each of the plurality of consecutive frames; and determine a confidence score of the bounding box for the one of the objects within the one of the plurality of consecutive frames.

In some embodiments, the instructions which, when executed by the processor, may further cause the processor to: determine from a region defined by the bounding box for the one of the objects within the one of the plurality of consecutive frames, keypoints of the one of the objects within the one of the plurality of consecutive frames; and determine confidence scores of the keypoints of the one of the objects within the one of the plurality of consecutive frames.

In some embodiments, the instructions which, when executed by the processor, may further cause the processor to: regress a region defined by the bounding box for the one of the objects within the one of the plurality of consecutive frames into heatmaps of the one of the objects within the one of the plurality of consecutive frames; suppress the heatmaps of the one of the objects within the one of the plurality of consecutive frames into keypoints of the one of the objects within the one of the plurality of consecutive frames with cross-heatmap pose non-maximum suppression (NMS); and determine confidence scores of the keypoints of the one of the objects within the one of the plurality of consecutive frames.

In some embodiments, the instructions which, when executed by the processor, may further cause the processor to: apply a model ensemble mode combing two or more pose estimation models to determine the keypoints of the one of the objects within the one of the plurality of consecutive frames, wherein the two or more pose estimation models include at least a first model and a second model.

In some embodiments, the model ensemble mode may include an expert mode in which, for each of the keypoints of each of the objects within each of the plurality of consecutive frames, a weight of one is assigned to one of pose estimation result for the first model and pose estimation result for the second model that has a higher average precision (AP) for the one of the keypoints, and a weight of zero is assigned to the other of the pose estimation result for the first model and the pose estimation result for the second model.

In some embodiments, the model ensemble mode may include an average mode in which, for all of the keypoints of each of the objects within each of the plurality of consecutive frames, a weight of 0.5 is assigned to pose estimation result for the first model and a weight of 0.5 is assigned to pose estimation result for the second model.

In some embodiments, one of the first model and the second model may be epoch 291, and the other of the first model and the second model may be epoch 293.

In some embodiments, the instructions which, when executed by the processor, may further cause the processor to: assign a same identifier to the bounding boxes indicating a same one of the objects across the plurality of consecutive frames, and associate the keypoints within the bounding boxes having the same identifier across the plurality of consecutive frames, so as to build a pose flow for each of the objects across the plurality of consecutive frames.

In some embodiments, the instructions which, when executed by the processor, may further cause the processor to: perform adaptive keypoint pruning on the keypoints of each of the objects within each of the plurality of consecutive frames with an adaptive keypoint pruner.

In some embodiments, the instructions which, when executed by the processor, may further cause the processor to: determine a keypoint drop threshold for each of predefined categories of keypoint, wherein each of the keypoints of each of the objects within each of the plurality of consecutive frames belongs to one of the predefined categories of keypoint; drop a keypoint having a confidence score lower than a keypoint drop threshold for one of the predefined categories of keypoint to which the keypoint belongs; and retain a keypoint having a confidence score greater than or equal to a keypoint drop threshold for one of the predefined categories of keypoint to which the keypoint belongs.

In some embodiments, the instructions which, when executed by the processor, may further cause the processor to: convert the result of the detection for each of the objects within each of the plurality of consecutive frames into an openSVAI standardized data format, so as to generate a standardized detection result.

In some embodiments, the instructions which, when executed by the processor, may further cause the processor to: convert the result of the estimation for each of the objects within each of the plurality of consecutive frames into an openSVAI standardized data format, so as to generate a standardized estimation result.

In some aspects, the present disclosure relates to a non-transitory computer readable medium storing computer executable instructions which, when executed by a processor of a computing device, causes the processor to perform any of the aforementioned methods.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIGS. 2A-2L exemplarily illustrate pose estimation process performed by a human pose estimation module according to some embodiments of the present disclosure.

DETAILED DESCRIPTION

Figure 1A:
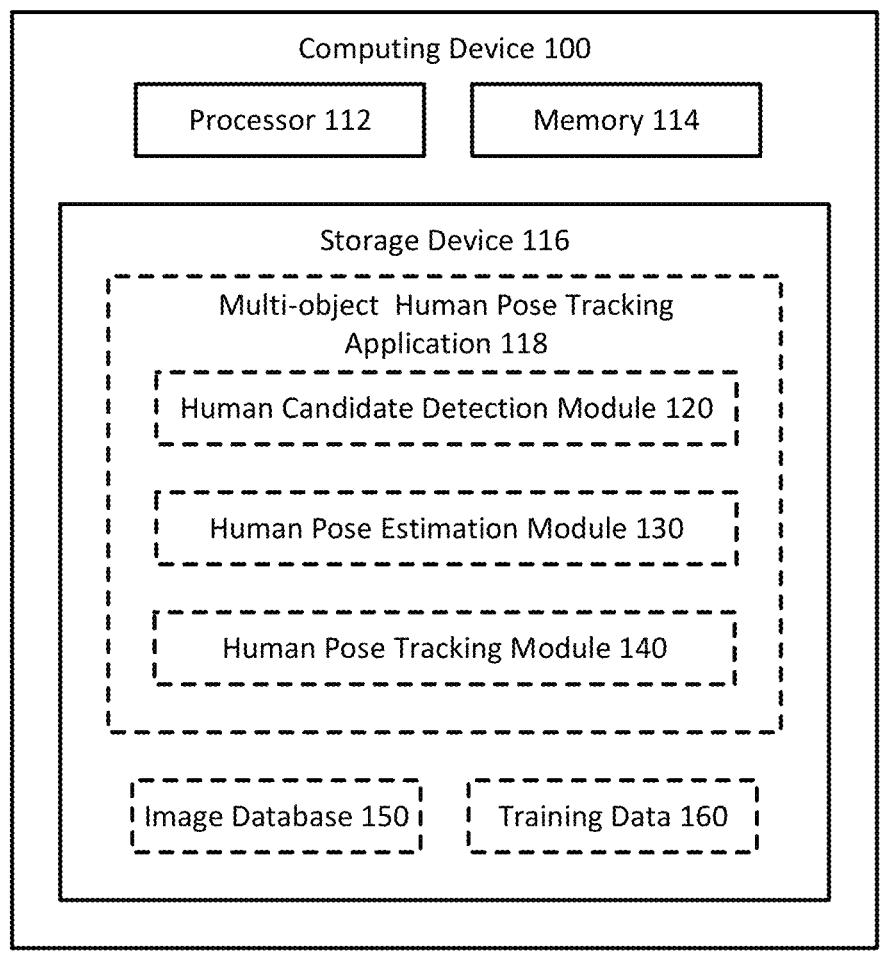
FIG. 1A is a block diagram schematically illustrating an example of the configuration of a computing device for tracking poses of multiple objects based on a plurality of single-object pose estimators according to some embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "having", "containing", "involving", and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term "module" may include memory (shared, dedicated, or group) that stores code executed by the processor.

The term "code", as used herein, may include software, firmware, and/or microcode, and may refer to programs, routines, functions, classes, and/or objects. The term "shared", as used above, means that some or all code from multiple modules may be executed using a single (shared) processor. In addition, some or all code from multiple modules may be stored by a single (shared) memory. The term "group", as used above, means that some or all code from a single module may be executed using a group of processors. In addition, some or all code from a single module may be stored using a group of memories.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The devices, systems, and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully with reference to the accompanying drawings, in which some embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Hereinafter, a specific example of a device for tracking poses of multiple objects (or persons) based on a plurality of single-object pose estimators according to some embodiments of the present disclosure will be described in detail with reference to FIGS. 1A-1C, FIGS. 2A-2L and FIGS. 3A-3C.

FIG. 1A is a block diagram schematically illustrating an example of the configuration of a computing device 100 for tracking poses of multiple objects based on a plurality of single-object pose estimators according to some embodiments of the present disclosure. In some embodiments, the computing device 100 may be a server computer, a cluster, a cloud computer, a general-purpose computer, a mobile device, a tablet, or a specialized computer, which may detect objects from each of a plurality of consecutive frames in a video sequence, estimate a pose of each of the objects within each of the plurality of consecutive frames, and track the poses of each of the objects across the plurality of consecutive frames. In some embodiments, the computing device 100 may communicate with other computing devices or services. In some embodiments, the communication is performed via a network, which may be a wired or wireless network, and may be of various forms, such as a public network and a private network.

As shown in FIG. 1A, the computing device 100 may include, but is not limited to, a processor 112 and a memory 114. Further, the computing device 100 may also include an optional storage device 116. In some embodiments, the computing device 100 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices or the like.

The processor 112 may be a central processing unit (CPU) which is configured to control operation of the computing device 100. The processor 112 can execute an operating system (OS) or other applications for the computing device 100. In some embodiments, the computing device 100 may have more than one CPU serving as the processor, such as two CPUs, four CPUs, eight CPUs, or any suitable number of CPUs. The memory 114 may be a volatile memory, such as a random-access memory (RAM), for storing data and instructions for the operation of the computing device 100. In some embodiments, the memory 114 may be a volatile memory array. In some embodiments, the computing device 100 may run on more than one memory 114. Further, the memory 114 may also be a non-volatile memory, such as a Read Only Memory (ROM), Erasable Programmable ROM (EPROM), Electrically EPROM (EEPROM), etc.

The storage device 116 may be a non-volatile data storage media for storing the OS (not shown) and other applications for the computing device 100. Examples of the storage device 116 may include non-volatile memory such as flash memory, memory cards, USB drives, hard drives, floppy disks, optical drives, solid-state drive (SSD) or any other types of data storage devices. In some embodiments, the storage device 116 may be a local storage, a remote storage, or a cloud storage. In some embodiments, the computing device 100 may have multiple storage devices 116, which may be identical storage devices or different types of storage devices, and the applications for the computing device 100 may be stored in one or more of the storage devices 116 of the computing device 100. In some embodiments, the computing device 100 may be a cloud computer, and the processor 112, the memory 114, and the storage device 116 are shared resources provided over the Internet on-demand. In some other embodiments, the computing device 100 may be a workstation communicatively connected to a mainframe server which stores all the data and instructions for operating the computing device 100, and in such a case, the storage device 116 may be optionally omitted.

As shown in FIG. 1A, the storage device 116 may store thereon a multi-object pose tracking application 118, and at least one of an image database 150 and training data 160. However, some or all of them may be stored in other locations and the present disclosure is not limited thereto.

In some embodiments, the multi-object pose tracking application 118 includes, among other things, a human candidate detection module 120, a human pose estimation module 130, and a human pose tracking module 140. In some embodiments, the multi-object pose tracking application 118 may include other applications or modules necessary for the operation thereof. It should be noted that the modules are each implemented by computer executable codes or instructions, or data table or databases, which collectively forms one application. In some embodiments, each of the modules may further include sub-modules. In some other embodiments, some of the modules may be combined as one stack. In yet some other embodiments, certain modules may be implemented as a circuit instead of executable code. In some further embodiments, some or all of the modules of the multi-object pose tracking application 118 may be located at a remote computing device or distributed in a cloud.

In some embodiments, the human candidate detection module 120 which, when loaded into the memory 114 and executed by the processor 112, may cause the processor 112 to, detect objects from each of a plurality of consecutive frames in a video sequence. In some embodiments, the human candidate detection module 120 which, when loaded into the memory 114 and executed by the processor 112, may cause the processor 112 to determine a bounding box for each of the objects from each of the plurality of consecutive frames, and determine a confidence score of the bounding box for the one of the objects within the one of the plurality of consecutive frames. Here, the objects within each of the plurality of consecutive frames may be persons to be tracked therein. The video sequence may be stored in the image database 150. However, the present disclosure is not limited thereto.

The human candidate detection module 120 may be implemented by a convolutional neural network (CNN). As an example, the human candidate detection module 120 may be implemented by a deformable feature pyramid network (FPN) (see, for example, Lin, T. Y., Dollar, P., Girshick, R. B., He, K., Hariharan, B., Belongie, S. J.: Feature pyramid networks for object detection. In: CVPR. vol. 1, p. 3 (2017), which is incorporated herein by reference in its entirety). In some embodiments, the human candidate detection module 120 may be implemented by a FPN network with ResNet 101 backbone. In further embodiments, the human candidate detection module 120 may be implemented by a FPN network with ResNet 151 backbone. In some embodiments, the human candidate detection module 120 may be implemented by a FPN network that is trained with ImageNet and COCO datasets. In further embodiments, the human candidate detection module 120 may be implemented by a FPN network that is trained with the CrowdHuman [17] dataset.

The aforementioned deformable FPN network may be determined based on an object detector selecting mechanism. Specifically, pre-trained models from deformable convolutional neural networks (ConvNets) [5] may be used. In order to increase the recall rate of human candidates, experiments are conducted on validation sets of both PoseTrack 2017 [1] and PoseTrack 2018 so as to choose the best object detector. Firstly, ground truth bounding boxes for human candidates are inferred from the annotated keypoints, because in PoseTrack 2017 dataset, the bounding box position is not provided in the annotations. In a specific exemplary implementation, the present disclosure locate a bounding box from the minimum and maximum coordinates of the 15 keypoints, and then enlarge the bounding box by 20% both horizontally and vertically. Even though ground truth bounding boxes are given in PoseTrack 2018 dataset, a more consistent version is inferred based on ground truth locations of keypoints. Those inferred ground truth bounding boxes are utilized to train the pose estimator.

For the object detectors, the deformable convolution versions of the Region-based Fully Convolutional Network (R-FCN) [4] and of the Feature Pyramid Network (FPN) [13], both with Residual Net (ResNet) 101 backbone[10] are compared. The FPN feature extractor is attached to the Fast Region-based Convolutional Network (Fast R-CNN) [7] head for detection. The detection results are compared with the ground truth based on the precision and recall rate on PoseTrack 2017 validation set. In order to eliminate redundant candidates, candidate(s) with lower likelihood or confidence score(s) are dropped. As shown in Table 1 illustrating Precision-Recall on PoseTrack 2017 validation set, for various drop thresholds of bounding boxes, the precision and recall rate of the detectors are given. A bounding box is correct if its intersection-over-union (IoU) with GT is above certain threshold, which is set to 0.4 for all experiments. In that case, the deformable FPN achieves a precision of 34.2 and a recall rate of 83.0, while the deformable R-FCN achieves a precision of 30.3 and a recall rate of 82.6, explicitly showing that the deformable FPN network performs better in terms of both the precision and the recall rate. For PoseTrack 2018 validation set, the deformable FPN network performs better as well. Therefore, with the above-described object detector selecting mechanism, the deformable FPN network may be selected as a human candidate detector to implement the human candidate detection module 120.

TABLE 1

| Drop thresholds of bounding box | 0.1 | 0.2 | 0.3 | 0.4 | 0.5 | 0.6 | 0.7 | 0.8 | 0.9 |
|---|---|---|---|---|---|---|---|---|---|
| Deformable FPN (ResNet101): prec | 17.9 | 27.5 | 32.2 | 34.2 | 35.7 | 37.2 | 38.6 | 40.0 | 42.1 |
| Deformable R-FCN (ResNet101): prec | 15.4 | 21.1 | 25.9 | 30.3 | 34.5 | 37.9 | 39.9 | 41.6 | 43.2 |
| Deformable FPN (ResNet101): recall rate | 87.7 | 86.0 | 84.5 | 83.0 | 80.8 | 79.2 | 77.0 | 73.8 | 69.0 |
| Deformable R-FCN (ResNet101): recall rate | 87.7 | 86.5 | 85.0 | 82.6 | 80.1 | 77.3 | 74.4 | 70.4 | 61.0 |

In addition, in order to measure the gap between ideal detection results and detection results generated with the selected deformable FPN network, further experiments are conducted. Specifically, based on the fact that the upper bound for detection is the ground truth bounding box location, the ground truth bounding boxes are fed to the subsequent human pose estimation module 130 and human pose tracking module 140, which will be described in detail below, and its performance is compared with that of the selected object detector (i.e., deformable FPN network) on the validation set. As shown in Table 2 illustrating comparison of single-frame pose estimation results using various detectors on PoseTrack 2017 validation set, for various predefined keypoints, average precision (AP) achieved with the ground truth detections, deformable FPN and deformable R-FCN are given. It can be seen that the pose estimation performs around 7% better with ground truth detections (a total precision of 81.7 with ground truth detections, and a total precision of 74.6 with the deformable FPN). Additionally, the pose estimation performs 0.9% better with the deformable FPN network than with the deformable R-FCN network (a total precision of 74.6 with the deformable FPN network, and a total precision of 73.7 with the deformable R-FCN network), which further validates the proper selection of the deformable FPN network, instead of the deformable R-FCN network, as the object detector.

TABLE 2

| Average Precision (AP) | Head | Shou | Elb | Wri | Hip | Knee | Ankl | Total |
|---|---|---|---|---|---|---|---|---|
| Ground Truth Detections | 88.9 | 88.4 | 82.7 | 74.7 | 78.9 | 79.4 | 75.4 | 81.7 |
| Deform FPN (ResNet101) | 80.7 | 81.2 | 77.4 | 70.2 | 72.6 | 72.2 | 64.7 | 74.6 |
| Deform R-FCN (ResNet101) | 79.6 | 80.3 | 75.9 | 69.0 | 72.0 | 71.6 | 64.3 | 73.7 |

Also, as shown in Table 3 illustrating comparison of multi-frame pose tracking results using various detectors on PoseTrack 2017 validation set, for various predefined keypoints, Multi-Object Tracking Accuracy (MOTA) results achieved with the ground truth detections, deformable FPN and deformable R-FCN are given. The term "MOTA" may refer to a criterion for evaluating performance of human pose tracking systems and/or apparatuses. The higher the MOTA result or value, the better the human pose tracking system or apparatus is. It can be seen that the pose tracking performs around 6% better with ground truth detections (a MOTA value of 67.0 with ground truth detections, and a MOTA score of 61.3 with the deformable FPN). Additionally, the pose tracking performs 2.3% better with the deformable FPN network than with the deformable R-FCN network (a MOTA value of 61.3 with the deformable FPN network, and a MOTA score of 59.0 with the deformable R-FCN network), which also further validates the proper selection of the deformable FPN network, instead of the deformable R-FCN network, as the object detector.

After determining the deformable FPN network as an object detector based on the object detector selecting mechanism and training it with datasets from the training data 160, a video sequence consisting of a plurality of consecutive frames stored in the image database 150 may be acquired/retrieved and fed to the human candidate detection module 120, so as to detect objects from each of the plurality of consecutive frames. As an example, FIG. 3A exemplarily illustrates output produced by the human candidate detection module 120 according to some embodiments of the present disclosure. Specifically, a plurality of bounding boxes each of which locates a respective one of a plurality of objects within a frame are detected and shown in FIG. 3A.

Then the result of the detection for each of the objects within each of the plurality of consecutive frames is converted into an openSVAI standardized data format, so as to generate a standardized detection result for each of the objects within each of the plurality of consecutive frames.

OpenSVAI is a library that provides modular implementation of components such as object detection, single-person pose estimation, pose tracking, semantic segmentation, etc. Existing open-sourced projects are usually not compatible. In order to build a complex system that consists of multiple components (each component is a self-sufficient research topic), we provide such a library that also standardizes the inputs and outputs of each component. Thus, each component's method is conveniently replaceable, making the build of a system much easier. The inputs and outputs are JavaScript Object Notation (JSON) files with a standardized data structure, which covers the information needed in a vision system: image ID, image path, image name, candidate, candidate ID, candidate's pose, candidate's mask, etc.

In some embodiments, the human candidate detection module 120 which, when loaded into the memory 114 and executed by the processor 112, may further cause the processor 112 to, after generating the standardized detection result for each of the objects within each of the plurality of consecutive frames, send the standardized detection result to the human pose estimation module 130.

In some embodiments, the human pose estimation module 130 which, when loaded into the memory 114 and executed by the processor 112, may cause the processor 112 to, upon receiving the standardized detection result for each of the objects within each of the plurality of consecutive frames, estimating a pose of each of the objects within each of the plurality of consecutive frames. In some embodiments, the human pose estimation module 130 which, when loaded into the memory 114 and executed by the processor 112, may cause the processor 112 to determine, from a region defined by the bounding box for the one of the objects within the one of the plurality of consecutive frames, keypoints of the one of the objects within the one of the plurality of consecutive frames, and determine confidence scores of the keypoints of the one of the objects within the one of the plurality of consecutive frames.

Here, the term "keypoint" may refer to a body keypoint satisfying a set of geometric constraints and inter-depen-

TABLE 3

| — | MOTA Head | MOTA Shou | MOTA Elb | MOTA Wri | MOTA Hip | MOTA Knee | MOTA Ankl | MOTA Total |
|---|---|---|---|---|---|---|---|---|
| GT Detections | 78.8 | 78.2 | 65.6 | 56.3 | 64.4 | 63.8 | 56.2 | 67.0 |
| D-FPN-101 | 68.9 | 70.9 | 62.7 | 54.6 | 59.5 | 59.8 | 48.7 | 61.3 |
| D-RFCN-101 | 66.5 | 68.1 | 60.1 | 52.2 | 57.4 | 57.9 | 47.4 | 59.0 | dency imposed by the human body model. In some embodiments, there may be defined multiple categories of keypoint. Hereinafter, details of human pose estimation will be described and explained by taking 15 categories of keypoint (such as, a neck keypoint, a left shoulder keypoint, a right shoulder keypoint, a left elbow keypoint, a right elbow keypoint, a left wrist keypoint, a right wrist keypoint, a left knee keypoint, a right knee keypoint, a left ankle keypoint, a right ankle keypoint, etc.) as an example. However, it is to be noted that the number of categories of keypoint is not limited thereto, and there may be more or fewer categories of keypoint than described in example embodiments.

In some embodiments, the human pose estimation module 130 may be implemented by a convolutional neural network (CNN). In some embodiments, the human pose estimation module 130 may be implemented by a Cascaded Pyramid Net-works (CPN) (see, for example, Chen, Y., Wang, Z., Peng, Y., Zhang, Z., Yu, G., Sun, J.: Cascaded Pyramid Network for Multi-object Pose Estimation. In: CVPR (2018), which is incorporated herein by reference in its entirety).

Specifically, the aforementioned CPN network is trained with the merged dataset of PoseTrack 2018 and COCO for 260 epochs, and then fine-tuned solely on PoseTrack 2018 training set for 40 epochs in order to mitigate the regression on head. For COCO dataset, bottom-head and top-head positions are not given. These keypoints are inferred through rough interpolation on the annotated keypoints. It is found that by finetuning on the PoseTrack dataset, the prediction on head keypoints (including a neck keypoint, etc.) will be refined. During finetuning, the technique of online hard keypoint mining, only focusing on losses from the 7 hardest keypoints out of the total 15 keypoints, is utilized.

Thereafter, the CPN network is tested on both PoseTrack 2017 and PoseTrack 2018 validation sets. That is, feed both PoseTrack 2017 and PoseTrack 2018 validation sets to the trained CPN network and generate a set of predicted joint coordinates (or keypoint coordinates) in the image coordinate system, and compare the set of predicted joint coordinates with ground truth joint coordinates, so as to test the pose estimation performance of the trained model. The first two rows of Table 4, which illustrates comparison of single-frame pose estimation results with different ensemble modes on PoseTrack 2017 validation set, show that different models (for example, epoch 291 and 293, which are two trained models having relatively better performance in terms of average precision (AP)) perform differently on different categories of keypoint. As an example, for epoch 291, the prediction of shoulders (an AP of 81.2) and hips (an AP of 72.6) renders better results than epoch 293 (an AP of 80.8 for shoulders, an AP of 70.1 for hips) on validation sets of both PoseTrack 2017 and PoseTrack 2018. However, epoch 293 performs better on end limbs such as wrists (an AP of 71.3) and ankles (an AP of 65.7) than epoch 291 (an AP of 70.2 for wrists, an AP of 64.7 for ankles). Thus, in some embodiments, in order to render more accurate estimation, a manifold of two models from epoch 291 and 293 may be used during the testing.

Two manifold modes: (1) an average mode in which, for all predefined categories of keypoint, a weight of 0.5 is assigned to epoch 291 and a weight of 0.5 is assigned to epoch 293; and (2) an expert mode in which, for each of the predefined categories of keypoint, a weight of one is assigned to one of two models from epoch 291 and epoch 293 having a higher AP for the respective category of keypoint and a weight of zero is assigned to the other of the two models, are tested, and results of the testing are illustrated in the last two rows in Table 4. As can be seem from Table 4, the average mode has a total AP for all categories of keypoint of 74.8, and the expert mode takes shoulder/hip predictions from the previous model and end-limb predictions from the latter and has a total AP of 75.0, both of which are higher than that of either of epoch 291 (74.6) and 293 (74.6), demonstrating that both modes perform better than plain testing on the pose estimation task. However, it is to be noted that although only pose estimation results on Pose-Track 2017 validation set is shown in Table 4, both the average mode and the expert mode perform better consistently on both PoseTrack 2017 and PoseTrack 2018 validation sets.

TABLE 4

| Average Precision (AP) | Head | Shou | Elb | Wri | Hip | Knee | Ankle | Total |
| --- | --- | --- | --- | --- | --- | --- | --- | --- |
| Epoch 291 | 80.7 | 81.2 | 77.4 | 70.2 | 72.6 | 72.2 | 64.7 | 74.6 |
| Epoch 293 | 80.5 | 80.8 | 77.9 | 71.3 | 70.1 | 72.9 | 65.7 | 74.6 |
| Average | 81.3 | 81.2 | 77.6 | 70.7 | 72.1 | 72.5 | 65.1 | 74.8 |
| Expert | 80.6 | 81.2 | 77.9 | 71.3 | 72.6 | 72.9 | 65.7 | 75.0 |

Therefore, in some embodiments, a model ensemble mode may be applied to determine keypoints of each of objects within each of a plurality of consecutive frames, which may boost performance of the human pose estimation module 130. As an example, an average mode in which, for all predefined categories of keypoint, a weight of 0.5 is assigned to a first model and a weight of 0.5 is assigned to a second model, may be applied to determine keypoints of each of objects within each of a plurality of consecutive frames. As another example, an expert mode in which, for each of the predefined categories of keypoint, a weight of one is assigned to one of a first model and a second model having a higher AP for the respective category of keypoint and a weight of zero is assigned to the other of the first model and the second model, may be applied to determine keypoints of each of objects within each of a plurality of consecutive frames. Here, it is to be noted that the model ensemble mode is not limited thereto, and there may be more than two models for forming model ensemble mode. In some embodiments, one of the first model and the second model may be epoch 291, and the other thereof may be epoch 293. In some embodiments, the average mode and the expert mode are combined, where each category is assigned with a 0.5:0.5 or 0:1 or 1:0 weight for the first and second models. The assignment of the weight is based on the respective AP. In one example, the category of "head" is assigned with 0.5:0.5 weight for epoch 291 and epoch 293, the category of "Hip" is assigned with epoch 291, the categories of "Elbow," "Wrist," "Knee," and "Ankle" are assigned with epoch 293, and the category of "shoulder" is assigned with epoch 291, or an average of epoch 291 and 293.

After training the CPN network with datasets from the training data 160 and determining to use a manifold of two models from epoch 291 and 293 to implement human pose estimation, the standardized detection result for each of the objects within each of the plurality of consecutive frames generated by the human candidate detection module 120 may be fed to the human pose estimation module 130, so as to estimate a pose of each of the objects within each of the plurality of consecutive frames. The pose estimation is performed on all bounding boxes (i.e., candidates) from the human candidate detection module 120. Specifically, a region defined by the bounding box for each of the objects within each of the plurality of consecutive frames may be regressed into heatmaps of the one of the objects within the one of the plurality of consecutive frames. Then, in order to render more accurate keypoint locations, for each bounding box, post-process may be performed on the predicted heatmaps with cross-heatmap pose non-maximum suppression (NMS) (see, for example, Ning, G., Zhang, Z., He, Z.: Knowledge-guided deep fractal neural networks for human pose estimation. IEEE Transactions on Multimedia 20(5), 1246-1259 (2018), which is incorporated herein by reference in its entirety). In particular, the heatmaps of each of the objects within each of the plurality of consecutive frames may be suppressed into the keypoints of the one of the objects within the one of the plurality of consecutive frames with a cross-heatmap pose NMS module 132.

Figure 1B:
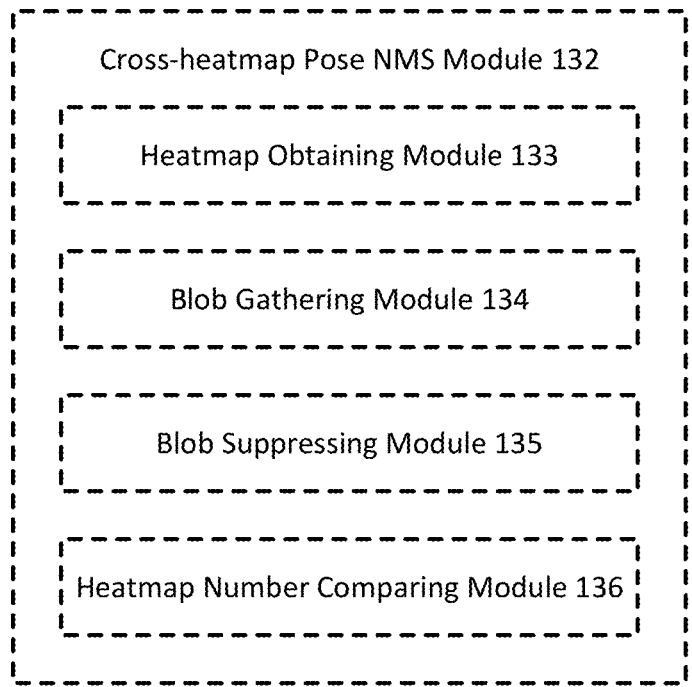
FIG. 1B is a block diagram schematically illustrating an example of the configuration of a cross-heatmap pose non-maximum suppressing (NMS) module according to some embodiments of the present disclosure.

As an example, FIG. 1B is a block diagram schematically illustrating an example of the configuration of a cross-heatmap pose NMS module 132 according to some embodiments of the present disclosure. In some embodiments, the cross-heatmap pose NMS module 132 may be included in the human pose estimation module 130. As shown in FIG. 1B, the cross-heatmap pose NMS module 132 may include, among other things, a heatmap obtaining module 133, a blob gathering module 134, a blob suppressing module 135, and a heatmap number comparing module 136. In some embodiments, the heatmap obtaining module 133 which, when loaded into the memory 114 and executed by the processor 112, may cause the processor 112 to receive a set of (for example, N) heatmaps regressed from an image of an object, wherein N is a positive integer. In some embodiments, the blob gathering module 134 which, when loaded into the memory 114 and executed by the processor 112, may cause the processor 112 to, gather blobs from all of the N heatmaps for suppression. In some embodiments, the blob suppressing module 135 which, when loaded into the memory 114 and executed by the processor 112, may cause the processor 112 to, determine the blob with the maximum response, and suppress other blobs from the same heatmap and blobs from other heatmaps very close to the determined blob in image coordinate system, and remove the heatmap from the set of heatmaps and let N=N−1. In some embodiments, the heatmap number comparing module 136 which, when loaded into the memory 114 and executed by the processor 112, may cause the processor 112 to, compare current heatmap number N=N−1 with zero. The process may repeat until current heatmap number N=N−1 equals to zero. As a result, keypoints of each of the objects within each of the plurality of consecutive frames and respective confidence scores of respective keypoints may be determined.

In some embodiments, the heatmap NMS procedure is as follows:

1. Detect blobs from all heatmaps.
2. Rank all the blobs based on their response. The response of a blob is the peak value of this blob.
3. Perform suppression with the $1^{st}$ blob (with maximum response):
  (1) Its corresponding joint position is determined as the peak position of this blob.
  (2) Suppress other blobs from the same heatmap and blobs from other heatmaps very close to the determined blob in image coordinate system, and remove the heatmap from the set of heatmaps.
4. For remaining blobs, keep them sorted/ranked. Perform suppression with the $1^{st}$ blob.
5. Repeat procedure 4 until all blobs are performed with suppression.
6. For those heatmaps whose joint position have not yet been determined, use their heatmap peak response position.

The implementation is open-sourced here: https://github.com/Guanghan/GNet-pose/blob/master/testing/utils/utils_nms.py, which is incorporated herein by reference in its entirety.

Kindly note: Keypoint corresponds to a single pixel in the heatmap, while a blob is obtained by blob detection from the heatmap. A blob is a collection of adjacent pixels; it can be of any shape; it can be regarded as a connected component. In a heatmap, there can be more than one blobs detected.

After heatmap NMS, each heatmap channel has no more than one blob. The keypoint will be the peak position of the blob from its corresponding channel map. For some keypoints, their corresponding heatmaps may not have remaining blobs. In this case, the keypoints for these channels will be the peak positions.

As an example, FIGS. 2A-2L exemplarily illustrate pose estimation process performed by the human pose estimation module 130 according to some embodiments of the present disclosure, wherein FIG. 2A exemplarily illustrates an object among a plurality of objects within a frame located by a respective bounding box according to some embodiments of the present disclosure, and FIGS. 2B-2K exemplarily illustrate part regression heatmap results of the image region defined by the bounding box for the object according to some embodiments of the present disclosure, and FIG. 2L exemplarily illustrates pose estimation result for the object with the cross-heatmap NMS suppression according to some embodiments of the present disclosure. The keypoints as well as lines connecting two adjacent keypoints may represent pose of an object. In some embodiments, an RGB-channel image of an object may be regressed into a set of 15 heatmaps, each of which may correspond to a keypoint. Also, it is to be noted that the number of heatmaps regressed from an image of an object is not limited thereto.

Figure 3A:
FIGS. 3A-3C exemplarily illustrates output produced by a human candidate detection module, a human pose estimation module and a human pose tracking module according to some embodiments of the present disclosure, respectively.
Figure 3B:

As an example, FIG. 3B exemplarily illustrates output produced by the human pose estimation module 130 according to some embodiments of the present disclosure. Specifically, part keypoints of the plurality of objects shown in FIG. 3A are determined from regions defined by the plurality of bounding boxes shown in FIG. 3A, and shown in FIG. 3B, wherein each of the plurality of objects corresponds to the same number of (for example, 15) predefined part keypoints.

Then the result of the estimation for each of the objects within each of the plurality of consecutive frames is converted into an openSVAI standardized data format, so as to generate a standardized estimation result for each of the objects within each of the plurality of consecutive frames.

The human pose estimation module 130 which, when loaded into the memory 114 and executed by the processor 112, may further cause the processor 112 to, after generating the standardized estimation result for each of the objects within each of the plurality of consecutive frames, send the standardized estimation result to the human pose tracking module 140.

In some embodiments, the human pose tracking module 140 which, when loaded into the memory 114 and executed by the processor 112, may cause the processor 112 to, upon receiving the standardized estimation result for each of the objects within each of the plurality of consecutive frames, track the poses of each of the objects across the plurality of consecutive frames. In some embodiments, the human pose tracking module 140 which, when loaded into the memory 114 and executed by the processor 112, may cause the processor 112 to assign a same identifier to the bounding boxes indicating a same one of the objects across the plurality of consecutive frames, and associate the keypoints within the bounding boxes having the same identifier across the plurality of consecutive frames, so as to build a pose flow for each of the objects across the plurality of consecutive frames. Here, the term "pose flow" may refer to a set of pose indicating the same person instance (i.e., object) within a plurality of consecutive frames.

In some embodiments, the human pose tracking module 140 may be implemented by a flow-based pose tracker (see, for example, Xiu, Y., Li, J., Wang, H., Fang, Y., Lu, C.: Pose flow: Efficient online pose tracking. In: BMVC (2018), which is incorporated herein by reference in its entirety). Specifically, the human pose tracking module 140 may build the association of cross-frame poses determined by the human pose estimation module 130 and form pose flows based thereon, and then reduce redundant pose flows and relink temporal disjoint ones with pose flow non-maximum suppression (NMS). Details of the process may be referred to the above reference.

In order to improve the performance of the human pose tracking module 140, extensive experiments are conducted. The performance of a pose tracker may be evaluated via MOTA, which is very strict. It penalizes mis-matches, false positives and misses. In order to get higher MOTA results, keypoints with lower confidence scores need to be dropped, sacrificing the recall rate of correct keypoints. Table 5 illustrates sensitivity analysis on how the drop thresholds of keypoints affect the performance in AP and MOTA (performed on Pose Track 2018 validation set). As can be seen from Table 5, with the drop threshold increases from 0.5 to 0.8, the AP of pose estimation decrease from 76.3 to 69.7 while the MOTA result of pose tracking increases significantly from 40.4 to 62.4, showing that the MOTA evaluation criterion quite sensitive to the drop rate of keypoints.

TABLE 5

| Threshold | 0.5 | 0.6 | 0.7 | 0.8 | 0.85 |
|---|---|---|---|---|---|
| Pose Estimation (AP) | 76.3 | 75.5 | 73.4 | 69.7 | 67.1 |
| Pose Tracking (MOTA) | 40.4 | 53.4 | 60.6 | 62.4 | 61.6 |

Considering the distinct difficulties of keypoints, e.g., shoulders are easier than ankles to localize, the confidence distribution for each joint may be not uniform. Dropping keypoints solely based on the keypoint confidence estimated by the pose estimator (for example, implemented by the human pose estimation module 130) may not be an ideal strategy for pose tracking. In some embodiments, statistics on the drop rate of keypoints are collected from different joints, as shown in Table 6, which illustrates statistics analysis on the drop rates of keypoints with different drop thresholds (the analysis is performed on PoseTrack 2018 validation set, and the numbers indicate the percentage of keypoints maintained after pruning). It can be seen that from left to right, the keypoints become more and more difficult to estimate, as reflected by their respective preservation rate. The least and most difficult joints are the shoulders and ankles, respectively. In other words, the pose estimator is most confident on the shoulders but least confident on ankles. Therefore, an adaptive keypoint pruner may help to increase the MOTA performance while maintaining high recall rates.

TABLE 6

| Threshold | Shou | Head | Elb | Hip | Knee | Wri | Ankl | Total |
|---|---|---|---|---|---|---|---|---|
| 0.70 | 82.1 | 75.3 | 68.3 | 66.0 | 60.2 | 60.2 | 54.6 | 68.6 |
| 0.75 | 78.4 | 71.1 | 63.9 | 61.5 | 56.2 | 54.9 | 49.9 | 64.3 |
| 0.85 | 70.2 | 62.3 | 54.3 | 53.0 | 48.8 | 46.2 | 42.3 | 56.0 |

In some embodiments, the adaptive keypoint pruner may be implemented by a convolutional neural network (CNN). In some embodiments, an adaptive keypoint pruner outperforms pruning keypoints solely based on a fixed threshold, which is sensitive to the test data and the pose estimator.

Figure 1C:
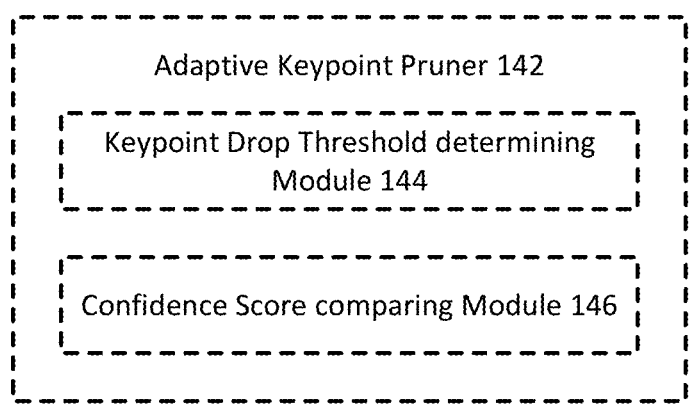
FIG. 1C is a block diagram schematically illustrating an example of the configuration of an adaptive keypoint pruner according to some embodiments of the present disclosure.

FIG. 1C is a block diagram schematically illustrating an example of the configuration of an adaptive keypoint pruner 142 according to some embodiments of the present disclosure. In some embodiments, the adaptive keypoint pruner 142 may be included in the human pose tracking module 140.

As shown in FIG. 1C, the adaptive keypoint pruner 142 may include, among other things, a keypoint drop threshold determining module 144, and a confidence score comparing module 146. In some embodiments, the keypoint drop threshold determining module 144 which, when loaded into the memory 114 and executed by the processor 112, may cause the processor 112 to determine a keypoint drop threshold for each of the predefined categories of keypoint. In some embodiments, the confidence score comparing module 146 which, when loaded into the memory 114 and executed by the processor 112, may cause the processor 112 to compare confidence score of each keypoint of each object within each frame with a respective keypoint drop threshold, drop the keypoint with a confidence score lower than the respective keypoint drop threshold, and retain the keypoint with a confidence score greater than or equal to the respective keypoint drop threshold. In this way, keypoints with lower confidence score may be adaptively dropped based on respective drop thresholds of respective categories of keypoint.

Figure 3C:

After performing adaptive keypoint pruning on the keypoints of each of the objects within each of the plurality of consecutive frames received from the human pose estimation module 130, retained keypoints of each of the objects within each of the plurality of consecutive frames may be fed to the human pose tracking module 140. The pose tracking process may start from the first frame where human candidates are detected. The human pose tracking module 140 may assign an identifier for each object across a plurality of frames. To prevent assignments of IDs for persons (i.e., objects) which have already left the visible image area, IDs are only kept for a limited number of frames, afterwards they are discarded. As an example, FIG. 3C exemplarily illustrates output produced by the human pose tracking module 140 according to some embodiments of the present disclosure. As shown in FIG. 3C, each of the plurality of objects shown in FIG. 3B are assigned a unique identifier, and the same object within the plurality of consecutive frames has the same identifier.

It is to be noted that although FIGS. 1A-1C show apparatuses and modules of the computing device 100, in other embodiments, the computing device 100 may include fewer, different, differently arranged, or additional apparatuses and/or modules than depicted in FIGS. 1A-1C. Additionally, or alternatively, one or more apparatuses and/or modules of the computing device 100 may perform one or more of the tasks described as being performed by one or more other apparatuses and/or modules of the computing device 100.

Hereinafter, methods of tracking poses of multiple objects according to some embodiments of the present disclosure will be described in detail with reference to FIGS. 4-7. It should be particularly noted that, unless otherwise stated in the present disclosure, the steps of any of the methods may be arranged in a different order, and are thus not limited to the sequential order as shown in the drawings. In addition, the same description as that of the aforementioned device for tracking poses of multiple objects will be omitted.

Figure 4:
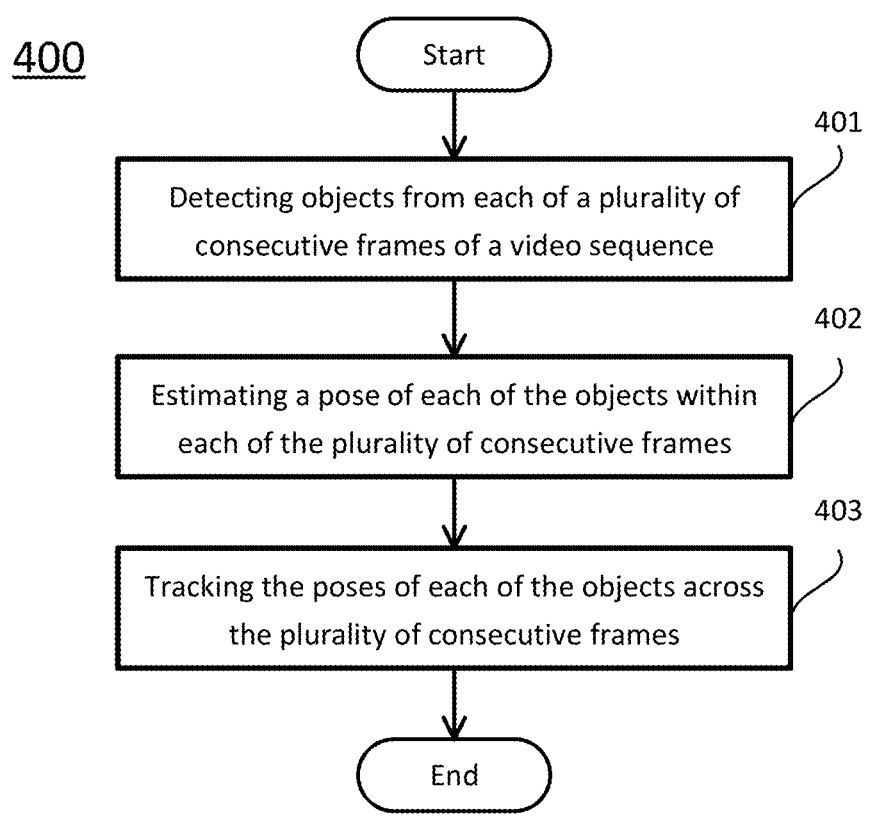
FIG. 4 is a flow chart schematically illustrating a method of tracking poses of multiple objects based on a plurality of single-object pose estimators according to some embodiments of the present disclosure.

FIG. 4 is a flow chart schematically illustrating a method of tracking poses of multiple objects based on a plurality of single-object pose estimators according to some embodiments of the present disclosure. In some embodiments, the method may be implemented by the computing device 100 shown in FIG. 1A. In some embodiments, the method shown in FIG. 4 may correspond to part or all of the function of the multi-object pose tracking application 118. The method of tracking poses of multiple objects may include the following steps.

At step 401, the human candidate detection module 120 which, when loaded into the memory 114 and executed by the processor 112, may cause the processor 112 to detect objects from each of a plurality of consecutive frames in a video sequence and send the detected result to the executed human pose estimation module 130. In some embodiments, the result includes bounding boxes in each of the frames. In some embodiments, the result is described in openSVAI format.

At step 402, the human pose estimation module 130 which, when loaded into the memory 114 and executed by the processor 112, may cause the processor 112 to, in response to receiving the detected result from the human candidate detection module 120, estimate a pose of each of the objects within each of the plurality of consecutive frames using the detection result, and send the estimated poses to the executed human pose tracking module 140. In some embodiments, the estimated poses are defined in openSVAI format.

At step 403, the human pose tracking module 140 which, when loaded into the memory 114 and executed by the processor 112, may cause the processor 112 to, in response to receiving the estimated poses of the objects, track the poses of each of the objects across the plurality of consecutive frames.

Figure 5:
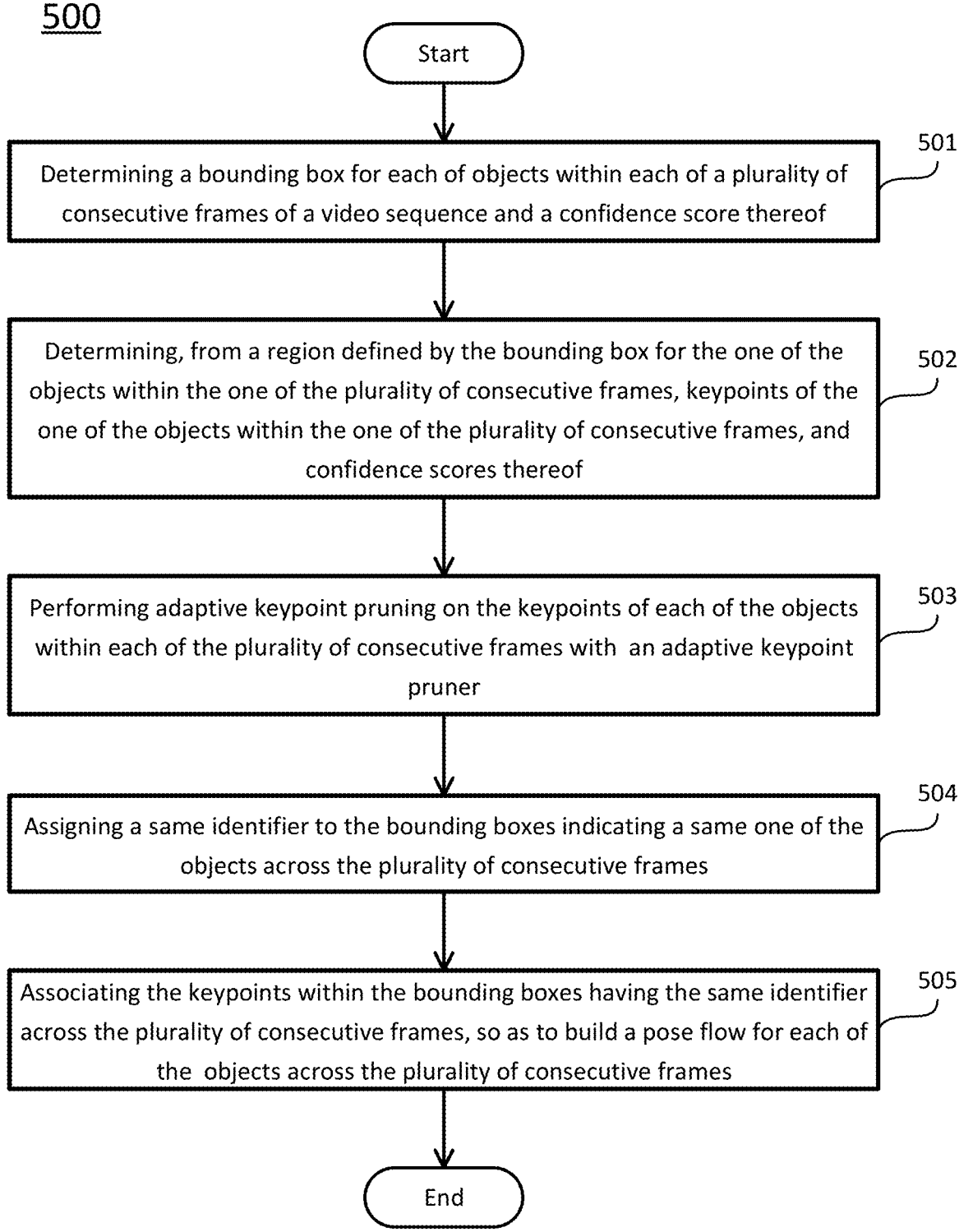
FIG. 5 is a flow chart schematically illustrating a method of tracking poses of multiple objects based on a plurality of single-object pose estimators according to further embodiments of the present disclosure.

FIG. 5 is a flow chart schematically illustrating a method of tracking poses of multiple objects based on a plurality of single-object pose estimators according to further embodiments of the present disclosure. In some embodiments, the method may be implemented by the computing device 100 shown in FIG. 1A. In some embodiments, the method shown in FIG. 5 may correspond to part or all of the function of the multi-object pose tracking application 118. The method of tracking poses of multiple objects may include the following steps.

At step 501, the human candidate detection module 120 which, when loaded into the memory 114 and executed by the processor 112, may cause the processor 112 to determine a bounding box for each of objects within each of a plurality of consecutive frames in a video sequence and a confidence score thereof, and send the determined bounding boxes and confidence scores to the executed human pose estimation module 130.

At step 502, the human pose estimation module 130 which, when loaded into the memory 114 and executed by the processor 112, may cause the processor 112 to, in response to receiving the bounding boxes and confidence scores, determine, from a region defined by the bounding box for the one of the objects within the one of the plurality of consecutive frames, keypoints of the one of the objects within the one of the plurality of consecutive frames, and confidence scores thereof, and send the results to the executed human pose tracking module 140.

In some embodiments, the step of determining, from a region defined by the bounding box for the one of the objects within the one of the plurality of consecutive frames, keypoints of the one of the objects within the one of the plurality of consecutive frames, and confidence scores thereof may include: regressing a region defined by the bounding box for the one of the objects within the one of the plurality of consecutive frames into heatmaps thereof; suppressing the heatmaps of the one of the objects within the one of the plurality of consecutive frames into keypoints thereof with cross-heatmap pose non-maximum suppression (NMS); and determining confidence scores of the keypoints of the one of the objects within the one of the plurality of consecutive frames. Details of the cross-heatmap pose NMS will be described below with reference to FIG. 6.

In some embodiments, the step of determining, from a region defined by the bounding box for the one of the objects within the one of the plurality of consecutive frames, keypoints of the one of the objects within the one of the plurality of consecutive frames and confidence scores thereof may further include: applying a model ensemble mode combing two or more pose estimation models to determine the keypoints of the one of the objects within the one of the plurality of consecutive frames, wherein the two or more pose estimation models include at least a first model and a second model. In some embodiments, the model ensemble mode may include an average mode in which, for all of the keypoints of each of the objects within each of the plurality of consecutive frames, a weight of 0.5 is assigned to pose estimation result for the first model and a weight of 0.5 is assigned to pose estimation result for the second model. In other embodiments, the model ensemble mode may include an expert mode in which, for each of the keypoints of each of the objects within each of the plurality of consecutive frames, a weight of one is assigned to one of pose estimation result for the first model and pose estimation result for the second model that has a higher average precision (AP) for the one of the keypoints, and a weight of zero is assigned to the other of the pose estimation result for the first model and the pose estimation result for the second model. In some embodiments, one of the first model and the second model is epoch 291, and the other of the first model and the second model is epoch 293.

At step 503, the human pose tracking module 140 which, when loaded into the memory 114 and executed by the processor 112, may cause the processor 112 to, in response to receiving the pose estimation result from the pose estimation module 130, perform adaptive keypoint pruning on the keypoints of each of the objects within each of the plurality of consecutive frames with an adaptive keypoint pruner. Details of the process performed by the adaptive keypoint pruner 142 will be described below with reference to FIG. 7.

At step 504, the human pose tracking module 140 which, when loaded into the memory 114 and executed by the processor 112, may cause the processor 112 to, after performing adaptive keypoint pruning, assign a same identifier to the bounding boxes indicating a same one of the objects across the plurality of consecutive frames.

At step 505, the human pose tracking module 140 which, when loaded into the memory 114 and executed by the processor 112, may cause the processor 112 to, after assigning the same identifier to the bounding boxes indicating the same one of the objects in the consecutive frames, associate the keypoints within the bounding boxes having the same identifier across the plurality of consecutive frames, so as to build a pose flow for each of the objects across the plurality of consecutive frames.

Figure 6:
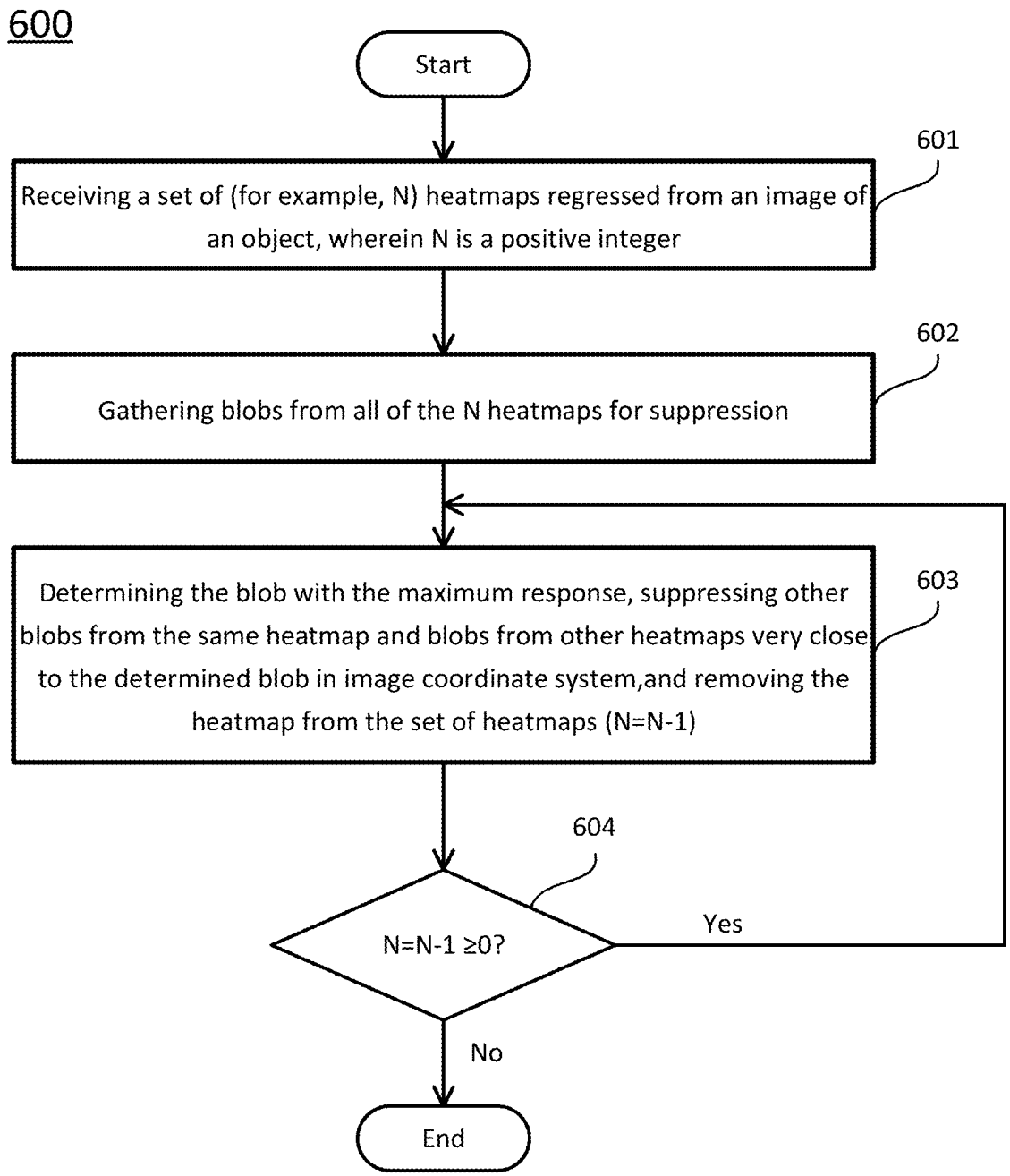
FIG. 6 is a flow chart exemplarily illustrating a method of suppressing heatmaps of an object into keypoints with cross-heatmap non-maximum (NMS) suppression according to some embodiments of the present disclosure.

FIG. 6 is a flow chart exemplarily illustrating a method of suppressing heatmaps of an object into keypoints with cross-heatmap NMS according to some embodiments of the present disclosure. In some embodiments, the method may be implemented by the cross-heatmap pose NMS module 132 shown in FIG. 1B. The method of cross-heatmap NMS suppression may include the following steps.

At step 601, the heatmap obtaining module 133 which, when loaded into the memory 114 and executed by the processor 112, may cause the processor 112 to receive a set of (for example, N) heatmaps regressed from an image of an object, where N is a positive integer, and send the heatmaps to the executed blob gathering module 134.

At step 602, the blob gathering module 134 which, when loaded into the memory 114 and executed by the processor 112, may cause the processor 112 to, in response to receiving the heatmaps, gather blobs from all of the N heatmaps for suppression, and send the gathered blobs to the executed blob suppressing module 135.

At step 603, the blob suppressing module 135 which, when loaded into the memory 114 and executed by the processor 112, may cause the processor 112 to, in response to receiving the gathered blobs, determine the blob with the maximum response, and suppress other blobs from the same heatmap and blobs from other heatmaps very close to the determined blob in image coordinate system, and remove the heatmap from the set of heatmaps (N=N−1).

At step 604, the heatmap number comparing module 136 which, when loaded into the memory 114 and executed by the processor 112, may cause the processor 112 to, compare current heatmap number N=N−1 with zero. If N=N−1 is greater than zero, then the process returns to step 603, while if not, then the process terminates. Here, it is to be noted that the term "terminate" means the suppression process with respect to the present object terminates. And other objects may follow the same suppression process. With the above-described cross-heatmap NMS method, keypoints of each of the objects within each of the plurality of consecutive frames may be determined.

Figure 7:
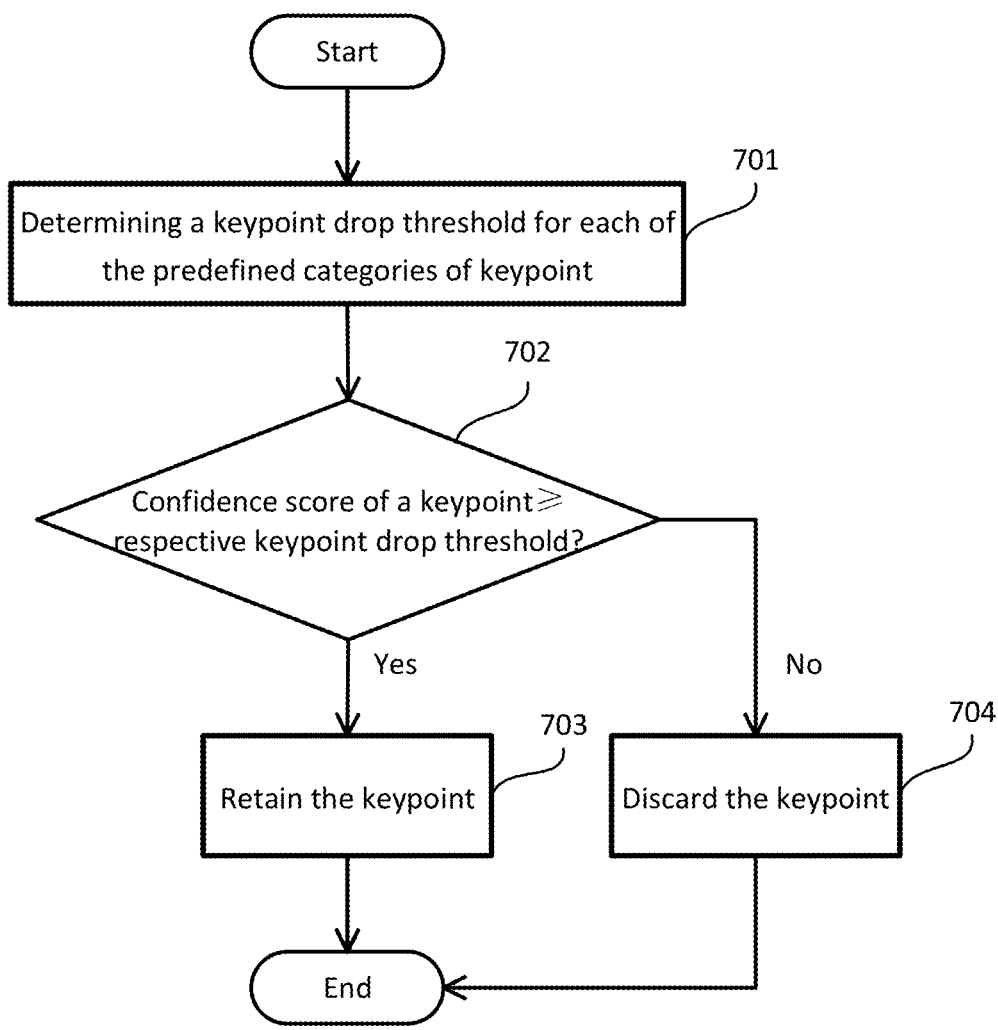
FIG. 7 is a flow chart exemplarily illustrating a method of pruning keypoints with an adaptive keypoint pruner according to some embodiments of the present disclosure.

FIG. 7 is a flow chart exemplarily illustrating a method of pruning keypoints according to some embodiments of the present disclosure. In some embodiments, the method may be implemented by the adaptive keypoint pruner 142 shown in FIG. 1C. The method of pruning keypoints may include the following steps.

At step 701, the keypoint drop threshold determining module 144 which, when loaded into the memory 114 and executed by the processor 112, may cause the processor 112 to determine a keypoint drop threshold for each of the predefined categories of keypoint, and send the keypoint drop thresholds to the confidence score comparing module 146.

At step 702, the confidence score comparing module 146 which, when loaded into the memory 114 and executed by the processor 112, may cause the processor 112 to, in response to receiving the keypoint drop thresholds, determine if confidence score of each keypoint of each object within each frame is greater than or equal to a respective keypoint drop threshold. If YES, the process proceeds to step 703, while if NO, the process proceeds to step 704.

At step 703, the confidence score comparing module 146 which, when loaded into the memory 114 and executed by the processor 112, may cause the processor 112 to retain the keypoint, in response to confidence score of the keypoint being greater than or equal to a respective keypoint drop threshold.

At step 704, the confidence score comparing module 146 which, when loaded into the memory 114 and executed by the processor 112, may cause the processor 112 to discard the keypoint, in response to confidence score of the keypoint being less than a respective keypoint drop threshold. With the above-described keypoint pruning method, keypoints with lower confidence score may be adaptively dropped based on respective drop thresholds of respective categories of keypoint.

As an example, final performance on the partial test set of PoseTrack 2018 implemented with the above-described apparatuses and methods is given in Table 7 illustrating single-frame pose estimation results on PoseTrack 2018 partial test set and Table 8 illustrating multi-frame pose tracking results on PoseTrack 2018 partial test set.

TABLE 7

| Average Precision (AP) | Head | Shou | Elb | Wri | Hip | Knee | Ankl | Total |
|---|---|---|---|---|---|---|---|---|
| Ours | 74.2 | 74.3 | 71.5 | 66.8 | 66.7 | 67.2 | 62.4 | 69.4 |

TABLE 8

| — | MOTA Head | MOTA Shou | MOTA Elb | MOTA Eri | MOTA Hip | MOTA Knee | MOTA Ankl | MOTA Total | MOTP Total | Pre Total | Rec Total |
|---|---|---|---|---|---|---|---|---|---|---|---|
| Ours | 60.2 | 62.1 | 53.9 | 50.1 | 52.2 | 52.6 | 47.4 | 54.5 | 85.9 | 83.9 | 68.9 |

In summary, some embodiments of the present disclosure provide an accurate and robust multi-object pose tracking system comprising a state-of-the-art object detector, single-person pose estimators, and human pose tracker. In some embodiments, the multi-object pose tracking system is configured to choose a generic object detector among state-of-the-art methods to detect human candidates, utilize cascaded pyramid network to estimate the corresponding human pose, and utilize a flow-based pose tracker to render keypoint-association across frames, i.e., assigning each human candidate a unique and temporally-consistent id, for the multi-target pose tracking purpose. Extensive ablative experiments are conducted to validate various choices of models and configurations and achieve better performance.

It is to be noted that, the multi-object pose tracking system based on a plurality of single-object pose estimators may be generic in its sub-modules, e.g., the human pose estimation module 130 and the human pose tracking module 140, which are replaceable and can be upgraded.

The advantages of the present disclosure, among other things, include: (1) an end-to-end human pose estimation and tracking system is provided, which has sequentially an object detection module detecting objects in a series frames, a single-person pose estimation module estimating poses of objects in the series frames, and a pose tracking module tracking the objects in the series frames based on the estimated poses; (2) an pose estimation module that combines advantages of different models, where each keypoint may have different weights of using the different models; (3) an openSVAI standardized data format is provided for the whole top-down approach.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. Andriluka, M., Iqbal, U., Milan, A., Insafutdinov, E., Pishchulin, L., Gall, J., Schiele, B., Posetrack: A benchmark for human pose estimation and tracking. In: Proceedings of the IEEE Conference on Computer Vision and Pattern Recognition, 2018, pp. 5167-5176.
2. Cao, Z., Simon, T., Wei, S. E., Sheikh, Y., Realtime multi-object 2d pose estimation using part affinity fields, CVPR, 2017, pp. 7291-7299.
3. Chen, Y., Wang, Z., Peng, Y., Zhang, Z., Yu, G., Sun, J., Cascaded Pyramid Network for Multi-object Pose Estimation, CVPR, 2018, pp. 7103-7112.
4. Dai, J., Li, Y., He, K., Sun, J.: R-FCN: Object detection via region-based fully convolutional networks, Advances in neural information processing systems, 2016.
5. Dai, J., Qi, H., Xiong, Y., Li, Y., Zhang, G., Hu, H., Wei, Y., Deformable convolutional networks, 2017, arXiv: 1703.06211.
6. Girdhar, R., Gkioxari, G., Torresani, L., Paluri, M., Tran, D., Detect-and-track: Efficient pose estimation in videos. In: Proceedings of the IEEE Conference on Computer Vision and Pattern Recognition, 2018, pp. 350-359.
7. Girshick, R.: Fast R-CNN, Proceedings of the IEEE international conference on computer vision, 2015, pp. 1440-1448.
8. Hao-Shu Fang, Shuqin Xie, Y. W. T., Lu, C., RMPE: Regional multi-object pose estimation, ICCV, 2017, arXiv:1612.00137.
9. He, K., Gkioxari, G., Dollar, P., Girshick, R.: Mask R-CNN, 2017 IEEE International Conference on Computer Vision (ICCV), 2017, pp. 2961-2969.
10. He, K., Zhang, X., Ren, S., Sun, J., Deep residual learning for image recognition, CVPR, 2016, pp. 770-778.
11. Insafutdinov, E., Andriluka, M., Pishchulin, L., Tang, S., Levinkov, E., Andres, B., Schiele, B., Arttrack: Articulated multi-object tracking in the wild, CVPR, 2017, pp. 6457-6465.
12. Iqbal, U., Milan, A., Gall, J.: Posetrack, Joint multi-object pose estimation and tracking, IEEE Conference on Computer Vision and Pattern Recognition (CVPR), 2017, pp. 2011-2020.
13. Lin, T. Y., Dollar, P., Girshick, R. B., He, K., Hariharan, B., Belongie, S. J., Feature pyramid networks for object detection, CVPR, 2017, pp. 2117-2125.
14. Newell, A., Huang, Z., Deng, J., Associative embedding: End-to-end learning for joint detection and grouping, Advances in Neural Information Processing Systems, 2017, pp. 1-11.
15. Ning, G., Zhang, Z., He, Z., Knowledge-guided deep fractal neural networks for human pose estimation, IEEE Transactions on Multimedia, 2018, arXiv:1705.02407.
16. Papandreou, G., Zhu, T., Kanazawa, N., Toshev, A., Tompson, J., Bregler, C., Murphy, K., Towards accurate multi-object pose estimation in the wild, CVPR, 2017, pp. 4903-4911.
17. Shao, S., Zhao, Z., Li, B., Xiao, T., Yu, G., Zhang, X., Sun, J., Crowdhuman: A benchmark for detecting human in a crowd, 2018, arXiv:1805.00123.
18. Xia, F., Wang, P., Chen, X., Yuille, A. L., Joint multi-object pose estimation and semantic part segmentation, CVPR, 2017, pp. 6769-6778.
19. Xiao, B., Wu, H., Wei, Y., Simple baselines for human pose estimation and tracking, ECCV, 2018, pp. 1-16.
20. Xiu, Y., Li, J., Wang, H., Fang, Y., Lu, C.: Pose flow, Efficient online pose tracking, BMVC, 2018, arXiv: 1802.00977.

We claim:

1. A method of tracking poses of multiple objects, comprising:
    detecting, by one or more processors, objects from each of a plurality of consecutive frames in a video sequence, comprising: determining a bounding box for each of the objects from each of the plurality of consecutive frames; and determining a confidence score of the bounding box for the one of the objects within the one of the plurality of consecutive frames;
    estimating, by the one or more processors, a pose of each of the objects within each of the plurality of consecutive frames, comprising: determining from a region defined by the bounding box for the one of the objects within the one of the plurality of consecutive frames, keypoints of the one of the objects within the one of the plurality of consecutive frames; determining confidence scores of the keypoints of the one of the objects within the one of the plurality of consecutive frames; and applying a model ensemble mode combing two or more pose estimation models to determine the keypoints of the one of the objects within the one of the plurality of consecutive frames; and
    tracking, by the one or more processors, the poses of each of the objects across the plurality of consecutive frames.

2. The method of claim 1, wherein the two or more pose estimation models comprise at least a first model and a second model, the model ensemble mode comprises an expert mode in which, for each of the keypoints of each of the objects within each of the plurality of consecutive frames, a weight of one is assigned to one of pose estimation result for the first model and pose estimation result for the second model that has a higher average precision (AP) for the one of the keypoints, and a weight of zero is assigned to the other of the pose estimation result for the first model and the pose estimation result for the second model.

3. The method of claim 1, wherein the two or more pose estimation models comprise at least a first model and a second model, the model ensemble mode comprises an average mode in which, for all of the keypoints of each of the objects within each of the plurality of consecutive frames, a weight of 0.5 is assigned to pose estimation result for the first model and a weight of 0.5 is assigned to pose estimation result for the second model.

4. The method of claim 1, wherein the two or more pose estimation models comprise at least a first model and a second model, one of the first model and the second model is epoch 291, and the other of the first model and the second model is epoch 293.

5. The method of claim 1, wherein the step of tracking the poses of each of the objects across the plurality of consecutive frames comprises:
assigning, by the one or more processors, a same identifier to the bounding boxes indicating a same one of the objects across the plurality of consecutive frames; and
associating, by the one or more processors, the keypoints within the bounding boxes having the same identifier across the plurality of consecutive frames, so as to build a pose flow for each of the objects across the plurality of consecutive frames.

6. The method of claim 1, wherein the step of tracking the poses of each of the objects across the plurality of consecutive frames further comprises:
performing, by the one or more processors, adaptive keypoint pruning on the keypoints of each of the objects within each of the plurality of consecutive frames with an adaptive keypoint pruner.

7. The method of claim 6, wherein the step of performing the adaptive keypoint pruning on the keypoints of each of the objects within each of the plurality of consecutive frames with the adaptive keypoint pruner comprises:
determining, by the one or more processors, a keypoint drop threshold for each of predefined categories of keypoint, wherein each of the keypoints of each of the objects within each of the plurality of consecutive frames belongs to one of the predefined categories of keypoint;
dropping, by the one or more processors, a keypoint having a confidence score lower than a keypoint drop threshold for one of the predefined categories of keypoint to which the keypoint belongs; and
retaining, by the one or more processors, a keypoint having a confidence score greater than or equal to a keypoint drop threshold for one of the predefined categories of keypoint to which the keypoint belongs.

8. The method of claim 1, wherein the step of detecting the objects from each of the plurality of consecutive frames in a video sequence is implemented by a deformable feature pyramid network (FPN) that is determined based on an object detector selecting mechanism.

9. The method of claim 1, wherein the step of detecting the objects from each of the plurality of consecutive frames in a video sequence further comprises:
converting, by the one or more processors, the result of the detection for each of the objects within each of the plurality of consecutive frames into an openSVAI standardized data format, so as to generate a standardized detection result.

10. The method of claim 1, wherein the step of estimating the pose of each of the objects within each of the plurality of consecutive frames further comprises:
converting, by the one or more processors, the result of the estimation for each of the objects within each of the plurality of consecutive frames into an openSVAI standardized data format, so as to generate a standardized estimation result.

11. A method of tracking poses of multiple objects, comprising:
detecting, by one or more processors, objects from each of a plurality of consecutive frames in a video sequence, comprising: determining a bounding box for each of the objects from each of the plurality of consecutive frames, and determining a confidence score of the bounding box for the one of the objects within the one of the plurality of consecutive frames;
estimating, by the one or more processors, a pose of each of the objects within each of the plurality of consecutive frames; and
tracking, by the one or more processors, the poses of each of the objects across the plurality of consecutive frames,
wherein the step of estimating the pose of each of the objects within each of the plurality of consecutive frames comprises:
regressing, by the one or more processors, a region defined by the bounding box for the one of the objects within the one of the plurality of consecutive frames into heatmaps of the one of the objects within the one of the plurality of consecutive frames;
suppressing, by the one or more processors, the heatmaps of the one of the objects within the one of the plurality of consecutive frames into keypoints of the one of the objects within the one of the plurality of consecutive frames with cross-heatmap pose non-maximum suppression (NMS); and
determining, by the one or more processors, confidence scores of the keypoints of the one of the objects within the one of the plurality of consecutive frames.

12. A device for tracking poses of multiple objects, comprising:
a processor; and
a memory storing instructions which, when executed by the processor, cause the processor to:
detect objects from each of a plurality of consecutive frames in a video sequence by: determining a bounding box for each of the objects from each of the plurality of consecutive frames; and determining a confidence score of the bounding box for the one of the objects within the one of the plurality of consecutive frames;
estimate a pose of each of the objects within each of the plurality of consecutive frames by: determining from a region defined by the bounding box for the one of the objects within the one of the plurality of consecutive frames, keypoints of the one of the objects within the one of the plurality of consecutive frames; determining confidence scores of the keypoints of the one of the objects within the one of the plurality of consecutive frames; and applying a model ensemble mode combing two or more pose estimation models to determine the keypoints of the one of the objects within the one of the plurality of consecutive frames; and
track the poses of each of the objects across the plurality of consecutive frames.

13. The device of claim 12, wherein the instructions which, when executed by the processor, further cause the processor to:
- assign a same identifier to the bounding boxes indicating a same one of the objects across the plurality of consecutive frames; and
- associate the keypoints within the bounding boxes having the same identifier across the plurality of consecutive frames, so as to build a pose flow for each of the objects across the plurality of consecutive frames.

14. The device of claim 12, wherein the instructions which, when executed by the processor, further cause the processor to:
- convert the result of the detection for each of the objects within each of the plurality of consecutive frames into an openSVAI standardized data format, so as to generate a standardized detection result; and
- convert the result of the estimation for each of the objects within each of the plurality of consecutive frames into an openSVAI standardized data format, so as to generate a standardized estimation result.

\* \* \* \* \*